(12) United States Patent
Knoch

(10) Patent No.: US 12,156,530 B2
(45) Date of Patent: Dec. 3, 2024

(54) SYSTEMS AND METHODS FOR VACUUM COOKING

(71) Applicant: The Livekindly Company Switzerland GmbH, Pfäffikon (CH)

(72) Inventor: Achim Knoch, Minden (DE)

(73) Assignee: The Livekindly Company Switzerland GmbH, Pfäffikon SZ (CH)

(*) Notice: Subject to any disclaimer, the term of this patent is extended or adjusted under 35 U.S.C. 154(b) by 678 days.

(21) Appl. No.: 17/366,720

(22) Filed: Jul. 2, 2021

(65) Prior Publication Data
US 2023/0000117 A1    Jan. 5, 2023

(51) Int. Cl.
*A23L 5/10*    (2016.01)
*A23L 5/30*    (2016.01)
*A47J 27/04*    (2006.01)

(52) U.S. Cl.
CPC ............... *A23L 5/13* (2016.08); *A23L 5/17* (2016.08); *A23L 5/30* (2016.08); *A47J 27/04* (2013.01); *A47J 2027/043* (2013.01)

(58) Field of Classification Search
CPC ...... A47J 27/04; A47J 27/05; A47J 2027/043; A23L 5/17; A23L 5/13
USPC .................... 99/472, 473, 474, 477
See application file for complete search history.

(56) References Cited

U.S. PATENT DOCUMENTS

| | | | |
|---|---|---|---|
| 3,488,770 A | 1/1970 | Atkinson | |
| 3,496,858 A | 2/1970 | Jenkins | |
| 4,132,809 A | 1/1979 | Desrosier | |
| 4,226,576 A | 10/1980 | Hildebolt | |
| 4,367,240 A | 1/1983 | MacLennan | |
| 4,555,485 A | 11/1985 | Marsh | |
| 6,379,738 B1 | 4/2002 | Dingman et al. | |
| 6,389,958 B1 * | 5/2002 | Ono ......................... | A23L 3/10 |
| | | | 422/26 |
| 8,603,555 B2 | 12/2013 | Innocenzi | |
| 9,578,983 B2 * | 2/2017 | Matsushima ............ | A23B 7/06 |
| 9,750,268 B1 | 9/2017 | Thomas | |
| 10,172,380 B2 | 1/2019 | Varadan et al. | |
| 10,287,568 B2 | 5/2019 | Kale et al. | |
| 10,499,663 B2 | 12/2019 | Kivelä et al. | |

(Continued)

FOREIGN PATENT DOCUMENTS

| | | |
|---|---|---|
| AU | 2002315573 B2 | 7/2005 |
| CA | 3100909 A1 | 12/2019 |

(Continued)

OTHER PUBLICATIONS

Ducrocq et al., "Rubisco: A promising plant protein to enrich wheat-based food without impairing dough viscoelasticity and protein polymerisation", Jun. 21, 2020, 13 pages.

(Continued)

*Primary Examiner* — Reginald Alexander
(74) *Attorney, Agent, or Firm* — Carr & Ferrell LLP

(57) ABSTRACT

The present technology is directed to a system for vacuum cooking a non-animal protein, High Moisture Extrusion (HME) food product using steam injection. In various instances the system may comprise: a vacuum cooking food processing system. In various instances the vacuum cooking food processing system may comprise a vacuum tumbler. In some embodiments, the vacuum tumbler may comprise: a vacuum sensor; a temperature sensor; a vacuum valve; a steam injector; and a dosing nozzle.

17 Claims, 8 Drawing Sheets

(56) References Cited

U.S. PATENT DOCUMENTS

| | | | |
|---|---|---|---|
| 10,745,682 | B2 | 8/2020 | Sebastian et al. |
| 2010/0021593 | A1 | 1/2010 | Denis |
| 2010/0074998 | A1 | 3/2010 | Vega et al. |
| 2011/0086130 | A1 | 4/2011 | Axelrod |
| 2015/0351427 | A1 | 12/2015 | Rose et al. |
| 2016/0326484 | A1 | 11/2016 | Jewell |
| 2017/0105567 | A1* | 4/2017 | Voit .............. A47J 27/002 |
| 2017/0303558 | A1 | 10/2017 | Eisner et al. |
| 2019/0008192 | A1 | 1/2019 | Brown et al. |
| 2019/0037893 | A1 | 2/2019 | Ajami et al. |
| 2019/0045809 | A1 | 2/2019 | Lee et al. |
| 2019/0200658 | A1 | 7/2019 | Vrljic et al. |
| 2019/0216106 | A1 | 7/2019 | Geistlinger et al. |
| 2019/0246679 | A1 | 8/2019 | Murphy et al. |
| 2020/0037654 | A1 | 2/2020 | Wang |
| 2020/0157506 | A1 | 5/2020 | Bayer et al. |
| 2020/0260747 | A1* | 8/2020 | Bolzacchini .......... A23B 4/052 |
| 2020/0323238 | A1 | 10/2020 | Pibarot |
| 2022/0202038 | A1 | 6/2022 | Knoch et al. |
| 2022/0202039 | A1 | 6/2022 | Knoch |
| 2022/0202040 | A1 | 6/2022 | Knoch |
| 2022/0202041 | A1 | 6/2022 | Knoch |
| 2022/0202054 | A1 | 6/2022 | Daoust |
| 2022/0202060 | A1 | 6/2022 | Knoch |
| 2022/0203593 | A1 | 6/2022 | Knoch et al. |
| 2024/0122216 | A1* | 4/2024 | Van Doorn .......... A23L 13/57 |

FOREIGN PATENT DOCUMENTS

| | | | |
|---|---|---|---|
| CN | 104171016 | A | 12/2014 |
| CN | 105495561 | A | 4/2016 |
| CN | 110623081 | A | 12/2019 |
| CN | 111869787 | A | 11/2020 |
| CN | 111903833 | A | 11/2020 |
| CN | 112006152 | A | 12/2020 |
| DE | 2257593 | | 5/1974 |
| DE | 3714593 | A1 | 11/1988 |
| DE | 102013220746 | A1 | 4/2015 |
| EP | 3100843 | A1 | 12/2016 |
| ES | 2165805 | A1 | 3/2002 |
| JP | H07000164 | | 1/1995 |
| JP | 2021508483 | A | 3/2021 |
| WO | WO2001049474 | A1 | 7/2001 |
| WO | WO-2007132114 | A2 * | 11/2007 ........ A23L 1/0121 |
| WO | WO2016120594 | A1 | 8/2016 |
| WO | WO2016151064 | A1 | 9/2016 |
| WO | WO2017127416 | A1 | 7/2017 |
| WO | WO2018177717 | A1 | 10/2018 |
| WO | WO2019143859 | A1 | 7/2019 |
| WO | WO2019231938 | A1 | 12/2019 |
| WO | WO2020030628 | A1 | 2/2020 |
| WO | WO2020037368 | A1 | 2/2020 |
| WO | WO2020038541 | A1 | 2/2020 |
| WO | WO2020079440 | A1 | 4/2020 |
| WO | WO2020092306 | A1 | 5/2020 |
| WO | WO2020152689 | A1 | 7/2020 |
| WO | WO2020154634 | A1 | 7/2020 |
| WO | WO2020180651 | A1 | 10/2020 |
| WO | WO2020208104 | A1 | 10/2020 |
| WO | WO2020210547 | A1 | 10/2020 |
| WO | WO2020232347 | A1 | 11/2020 |

OTHER PUBLICATIONS

Stefano et al., "Plant RuBisCo: An Underutilized Protein for Food Applications", Aug. 13, 2018, 12 pages.

Thewis et al., "Livestock Production: Prospects Over the Next Decades and Alternative Protein Bioresources", AgroLife Scientific Journal—vol. 1, 2012, 10 pages.

Yuliarti et al., "Structuring the meat analogue by using plant-based derived composites," Journal of Food Engineering, vol. 288, Jan. 2021, available on the Internet <URL:https://doi.org/10.1016/j.jfoodeng.2020.110138>, 3 pages (abstract only).

Dekkers et al., "Structuring processes for meat analogues," Trends in Food Science & Technology, vol. 81, Nov. 2018, pp. 25-36.

Mattice et al., "Comparing methods to produce fibrous material from zein," Food Research International, vol. 128, Feb. 2020, available on the Internet <URL:https://www.sciencedirect.com/science/article/abs/pii/S0963996919306908>, 3 pages (abstract only).

Mattice, "Characterizations of Zein: Evaluating Functionality and Potential uses in Food Structuring," Ph.D. thesis at University of Guelph, Guelph, Ontario, Canada, 145 pages.

Samard et al., "A comparison of physicochemical characteristics, texture, and structure of meat analogue and meats," Journal of the Science of Food and Agriculture, vol. 99, Issue 6, Apr. 2019, pp. 2708-2715, available on the Internet <URL:https://onlinelibrary.wiley.com/doi/abs/10.1002/jsfa.9438 https://onlinelibrary.wiley.com/doi/abs/10.1002/jsfa.9438>, 2 pages (abstract only).

Nieuwland et al., "Food-grade electrospinning of proteins," Innovative Food Science & Emerging Technologies, vol. 20, Oct. 2013, pp. 269-275.

Schreuders et al., "Comparing structuring potential of pea and soy protein with gluten for meat analogue preparation," Journal of Food Engineering, vol. 261, Nov. 2019, pp. 32-39.

Knoch, "Systems and Methods for Vacuum Cooking," U.S. Appl. No. 17/366,720, filed Jul. 2, 2021; Specification, Claims, Abstract, and Drawings, 42 pages.

Fiberstar, "Food Applications: Naturla Citrus Fiber | High Water Holding | Emulsification | Gelling Properties," [online], [retrieved on Dec. 21, 2021], Retrieved from the Internet: <URL:https://www.fiberstar.net/citrus-fiber-food-applications/>, 6 pages.

Gelsiki et al., "Plant-based burgers work to duplicate flavor, texture of protein-based varieties," Meat+Poultry, [online], [retrieved on Dec. 21, 2021], Retrieved from the Internet: <URL:https://www.meatpoultry.com/articles/23164-plant-based-burgers-work-to-duplicate-flavor-texture-of-protein-based-varieties>, 3 pages.

Osen et al, "High-Moisture Extrusion: Meat Analogues," In: Reference Module in Food Science, Jan. 1, 2016, DOI: 10.1016/B978-0-08-100596-5.03099-7, Retrieved from the Internet: <URL:http://dx.doi.org/10.1016/8978-0-08-I00596-5.03099-7>, 7 pages.

Mannar et al., "Micronutrient Fortification of Foods—Rationale, Application and Impact," Indian Journal of Pediatrics, vol. 71, Nov. 2004, [Retrieved on Feb. 23, 2022] Retrieved from Internet <URL:https://doi.org/10.1007/BF02828115>, pp. 997-1002.

Osendarp et al. "Large-Scale Food Fortification and Biofortification in Low- and Middle-Income Countries: A Review of Programs, Trends, Challenges, and Evidence Gaps," Food and Nutrition Bulletin, vol. 39, Issue 2, Jun. 24, 2018, [Retrieved on Feb. 23, 2022] Retrieved from Internet <URL:https://www.ncbi.nlm.nih.gov/pmc/articles/PMC7473077/>, <DOI:10.1177/0379572118774229>, pp. 315-331.

* cited by examiner

SYSTEMS AND METHODS FOR VACUUM COOKING

FIELD OF TECHNOLOGY

Embodiments of the present disclosure are directed to systems and methods for vacuum cooking. More particularly, not by limitation vacuum cooking a non-animal protein, High Moisture Extrusion (HME) food product using steam injection.

SUMMARY

According to some embodiments, the present technology is directed to a system for vacuum cooking a non-animal protein, High Moisture Extrusion (HME) food product using steam injection may comprise: a vacuum cooking food processing system. In various instances the vacuum cooking food processing system may comprise a vacuum tumbler. In some embodiments, the vacuum tumbler may comprise: a vacuum sensor; a temperature sensor; a vacuum valve; a steam injector; and a dosing steam nozzle. In some instances the vacuum cooking food processing system may further comprise a main operation panel, the main operation panel being electronically connected to the vacuum cooking food processing system for controlling vacuum cooking of the non-animal protein, High Moisture Extrusion (HME) food product, the main operation panel comprising: at least one processor; and a memory storing processor-executable instructions, wherein the at least one processor is configured to implement the following operations upon executing the processor-executable instructions: automatically sensing pressure in the vacuum tumbler using the vacuum sensor, the automatically sensing pressure including sensing a base pressure; automatically sensing temperature of the non-animal protein, High Moisture Extrusion (HME) food product in the vacuum tumbler using the temperature sensor, the automatically sensing temperature including sensing a base temperature; automatically and dynamically controlling, based on the base pressure and the base temperature, an adjusted pressure in the vacuum tumbler using the vacuum valve and the steam injector thereby guiding a tenderness and a texture of the non-animal protein, High Moisture Extrusion (HME) food product; and automatically and dynamically controlling, based on the adjusted pressure in the vacuum tumbler, a water-based flavor solution in the vacuum tumbler using the dosing steam nozzle thereby adjusting a taste of the non-animal protein, High Moisture Extrusion (HME) food product.

In various embodiments the automatically and dynamically controlling the water-based flavor solution in the vacuum tumbler comprises increasing the water-based flavor solution in the vacuum tumbler to increase a flavor of the non-animal protein, High Moisture Extrusion (HME) food product.

In some embodiments the automatically and dynamically controlling the water-based flavor solution in the vacuum tumbler comprises increasing total water content in the vacuum tumbler to decrease a flavor of the non-animal protein, High Moisture Extrusion (HME) food product.

In various embodiments the automatically and dynamically controlling the adjusted pressure in the vacuum tumbler comprises increasing the adjusted pressure in the vacuum tumbler using the steam injector thereby decreasing absorption of the water-based flavor solution by the non-animal protein, High Moisture Extrusion (HME) food product in the vacuum tumbler by preventing separating of the non-animal protein, High Moisture Extrusion (HME) food product into chunks during vacuum cooking thereby inhibiting absorption of the water-based flavor solution by the chunks of the non-animal protein, High Moisture Extrusion (HME) food product.

In some embodiments the increasing the adjusted pressure in the vacuum tumbler using the steam injector comprises injecting steam into the non-animal protein, High Moisture Extrusion (HME) food product in the vacuum tumbler thereby increasing the adjusted pressure in the vacuum tumbler compared with the base pressure.

In various embodiments the steam injector is a direct steam injector, the direct steam injector being a steam lance.

In various embodiments the injecting the steam into the non-animal protein, High Moisture Extrusion (HME) food product in the vacuum tumbler comprises controlling a volume and a rate of the injecting steam, the volume and the rate of steam injection guiding the texture of the non-animal protein, High Moisture Extrusion (HME) food product.

In some embodiments the steam injector is a steam infuser, the steam infuser simultaneously heating, mixing, and pumping the non-animal protein, High Moisture Extrusion (HME) food product using infused steam.

In various embodiments the automatically and dynamically controlling the adjusted pressure in the vacuum tumbler comprises decreasing the adjusted pressure in the vacuum tumbler compared with the base pressure using the vacuum valve increasing absorption of the water-based flavor solution by the non-animal protein, High Moisture Extrusion (HME) food product in the vacuum tumbler by separating the non-animal protein, High Moisture Extrusion (HME) food product into chunks during vacuum cooking causing absorption of the water-based flavor solution by the chunks of the non-animal protein, High Moisture Extrusion (HME) food product thereby guiding a tenderness and a texture of the non-animal protein, High Moisture Extrusion (HME) food product.

In some embodiments the decreasing the adjusted pressure in the vacuum tumbler compared with the base pressure comprises releasing steam from the vacuum tumbler using the vacuum valve thereby decreasing the adjusted pressure in the vacuum tumbler.

In various embodiments the texture of the non-animal protein, High Moisture Extrusion (HME) food product is an animal-meat-like texture; and wherein the tenderness of the non-animal protein, High Moisture Extrusion (HME) food product is an animal-meat-like tenderness.

In some embodiments the guiding the tenderness and the texture of the non-animal protein, High Moisture Extrusion (HME) food product comprises stabilizing the pressure in the vacuum tumbler and the temperature of the non-animal protein, High Moisture Extrusion (HME) food product in the vacuum tumbler using a pressure and temperature dynamic feedback loop.

In various embodiments the pressure and temperature dynamic feedback loop comprises: receiving a recipe pressure for a food product recipe; comparing the base pressure to the recipe pressure for the food product recipe; and wherein the automatically and dynamically controlling the adjusted pressure in the vacuum tumbler comprises matching the adjusted pressure in the vacuum tumbler to the recipe pressure for the food product recipe.

In some embodiments the pressure and temperature dynamic feedback loop comprises: receiving a recipe temperature for a food product recipe; comparing the base temperature to the recipe temperature for the food product recipe; and wherein the at least one processor is further configured to implement the operation of: automatically and dynamically controlling an adjusted temperature of the non-animal protein, High Moisture Extrusion (HME) food product in the vacuum tumbler, the automatically and dynamically controlling the adjusted temperature of the non-animal protein, High Moisture Extrusion (HME) food product in the vacuum tumbler comprising matching the adjusted temperature in the vacuum tumbler to the recipe temperature for the food product recipe.

In some embodiments the pressure and temperature dynamic feedback loop comprises: receiving a recipe pressure and a recipe temperature for a food product recipe; comparing the base pressure to the recipe pressure for the food product recipe and the base temperature to the recipe temperature for the food product recipe; wherein the automatically and dynamically controlling the adjusted pressure in the vacuum tumbler comprises matching the adjusted pressure in the vacuum tumbler to the recipe pressure for the food product recipe; and wherein the at least one processor is further configured to implement the operation of: automatically and dynamically controlling an adjusted temperature of the non-animal protein, High Moisture Extrusion (HME) food product in the vacuum tumbler, the automatically and dynamically controlling the adjusted temperature of the non-animal protein, High Moisture Extrusion (HME) food product in the vacuum tumbler comprising matching the adjusted temperature in the vacuum tumbler to the recipe temperature for the food product recipe.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DESCRIPTION OF EXEMPLARY EMBODIMENTS

Figure 1:
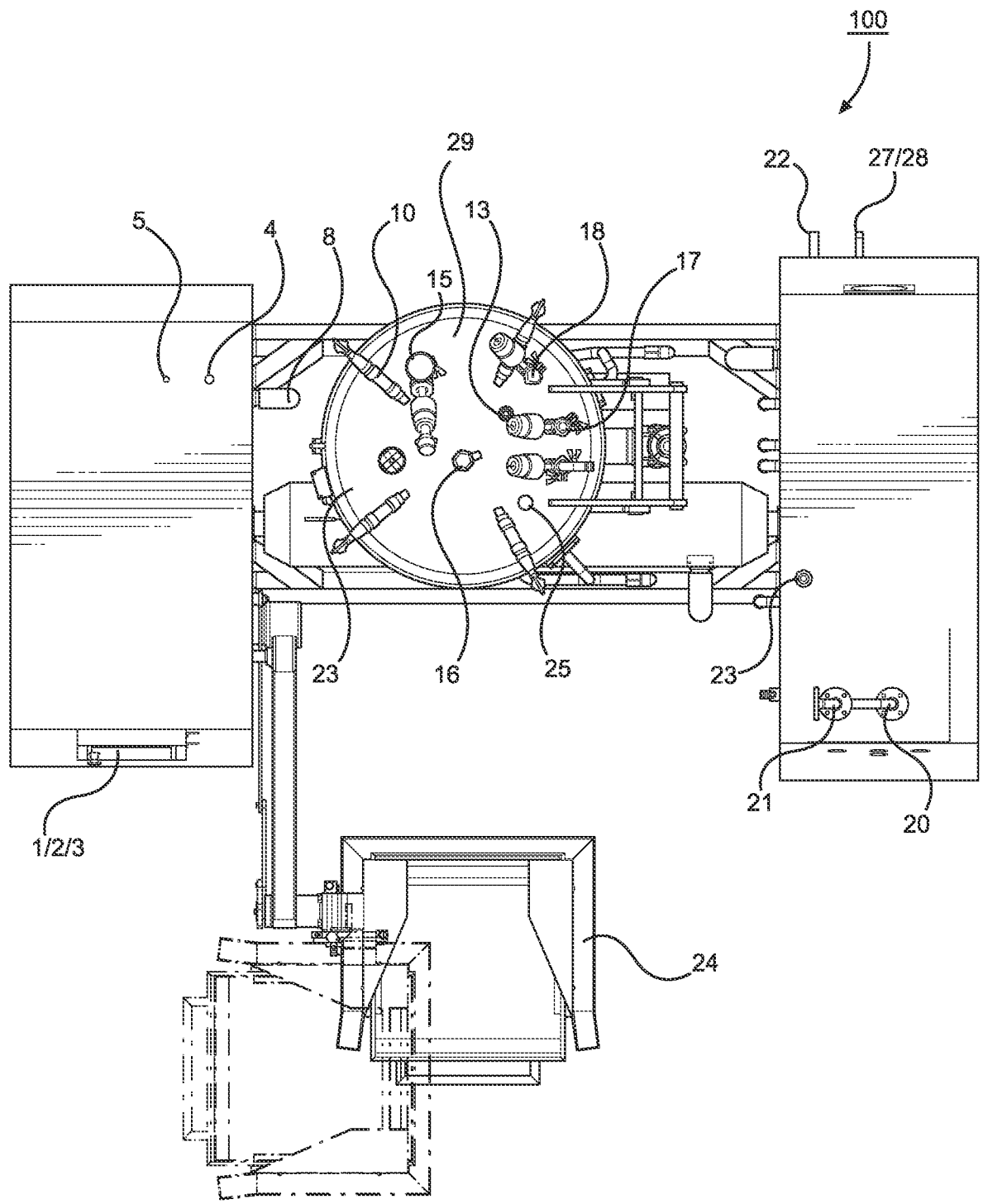
FIG. 1 illustrates a top view of a system for vacuum cooking a non-animal protein, High Moisture Extrusion (HME) food product using steam injection, according to various embodiments of the present technology.

Various embodiments of the present technology include a system for vacuum cooking a non-animal protein, High Moisture Extrusion (HME) food product using steam injection. High Moisture Extrusion (HME) is a food processing method that may be used to generate a food product that has meat-like structure (e.g., a fibrous texture similar to animal meat) using non-animal proteins such as plant proteins (e.g., soybean proteins, wheat gluten, cottonseed proteins, other plant proteins), bacterial proteins, and the like. The processing of non-animal proteins, such as plant proteins, into a meat analog using High Moisture Extrusion (HME) may be referenced as a fibrous texturate herein. During High Moisture Extrusion (HME) a temperature in an extruder (i.e., extruding may be the end step before shaping the food product) may be high (e.g., up to 170° C.). If spices and flavors are added before the extruding step (i.e., before the extruder), a taste profile of the food product may be damaged or even destroyed by the high temperature (e.g., up to 170° C.) in the extruder. Moreover, even if a relatively heat stable flavor could be identified, a high dose of the relatively heat stable flavor would be necessary. Thus, adding flavor (i.e., the taste of the food product) to the food may be done after extrusion of the High Moisture Extrusion (HME) food product. For example, adding spice, marinades, flavors (e.g., beef flavoring, chicken flavoring, and the like) to the High Moisture Extrusion (HME) food product after extrusion. One way to add the flavoring (e.g., beef flavoring, chicken flavoring, and the like) is using a batch mixer including a vacuum tumbler, which heats and mixes the raw ingredients. As the fibrous texturate is relatively compact during batch mixing, an ordinary user has problems getting the flavoring (e.g., beef flavoring, chicken flavoring, and the like) into the fibrous texturate pieces (i.e., chunks of fibrous texturate). However, an ordinary user is aware having the flavoring (e.g., beef flavoring, chicken flavoring, and the like) throughout the fibrous texturate is critical for a good quality food product with meat-like structure and taste. For example, if the taste of a food product is only on the surface of the fibrous texturate pieces (i.e., chunks of fibrous texturate), the flavor flavors (e.g., beef flavoring, chicken flavoring) would disappear for a consumer after consuming the initial top layer, resulting in a poor-quality food product with incomplete flavoring throughout the food product. Moreover, the poor-quality food product with incomplete flavoring does not have the desired flavoring (e.g., beef flavoring, chicken flavoring, and the like) throughout the fibrous texturate that is critical for a good quality food product with meat-like structure and taste.

In various embodiments systems and methods of the present technology solve this problem of a poor-quality food product with incomplete flavoring throughout the food product by heating the chunks (i.e., chunks of fibrous texturate) using a vacuum cooking food processing system including a vacuum tumbler with a water-based flavor solution so that the chunks are activated for absorbing the water-based flavor solution resulting in a flavor profile throughout the food product. Furthermore, various embodiments include a vacuum tumbler to further enhance absorption of the water-based flavor solution. For example, using a vacuum tumbler induces an expanding of the chunks (i.e., chunks of fibrous texturate) by decreasing steam pressure to increase vacuuming so that the water-based flavor solution is more easily absorbed into the chunks. In some instances, oil-based flavor is included in the flavoring. Moreover, vacuum cooking of the food product results in the food product being more tender resulting in a good quality food product with meat-like structure and taste. Additionally, systems and methods of the present technology enhance absorption of the water-based flavor solution by the chunks (i.e., chunks of fibrous texturate) by decreasing steam injection into the vacuum tumbler during the heating phase with the steam collapsing directly in the tumbler, which also makes a good quality food product by making the food product more tender. Moreover, the present technology including using a vacuum tumbler enables sensitive formulations (e.g., with only a small amount of flavoring) because of the enhanced absorption by the chunks resulting in enhancement of the flavor profile of the food product.

FIG. 1 illustrates a top view of a system for vacuum cooking a non-animal protein, High Moisture Extrusion (HME) food product using steam injection, according to various embodiments of the present technology. FIG. 1 shows the following elements: main operation panel 1 (e.g., may include a touch screen user interface), main switch 2, emergency stop 3, a power inlet 4, an air inlet 5, mixing motor cable 8, pneumatic cylinder 10, a steam injector 13 (e.g., a steam lance), a second safety valve 15, a vacuum sensor 16, vacuum valve 17 (e.g., a pneumatic vacuum valve), pneumatic release valve 18, direct steam 20 (e.g., flange), steam double jacket 21, condensate return 22 (e.g., thread may be 1 inch in diameter), supply water 23 (e.g., hose nipple may be 0.5 inches in diameter), foldable lift 24, dosing steam nozzle 25 (e.g., dosing steam nozzle may be 0.5 inches in diameter), water ring pump inflow 27 (e.g., thread may be 0.5 inches in diameter), water ring pump return 28 (e.g., thread may be ¾ inches), and vacuum tumbler 29. In some instances, the steam double jacket 21 is heated by steam, and the steam double jacket 21 is used to heat the vacuum tumbler 29 during vacuum cooking.

In some embodiments the system for vacuum cooking a non-animal protein, High Moisture Extrusion (HME) food product using steam injection may comprise: a vacuum cooking food processing system 100. In various instances the vacuum cooking food processing system 100 may comprise the vacuum tumbler 29. In some embodiments, the vacuum tumbler 29 may comprise: a vacuum sensor 16; a temperature sensor 12; the vacuum valve 17 (e.g., a pneumatic vacuum valve); the steam injector 13 (e.g., a steam lance); and the dosing steam nozzle 25.

Figure 8:
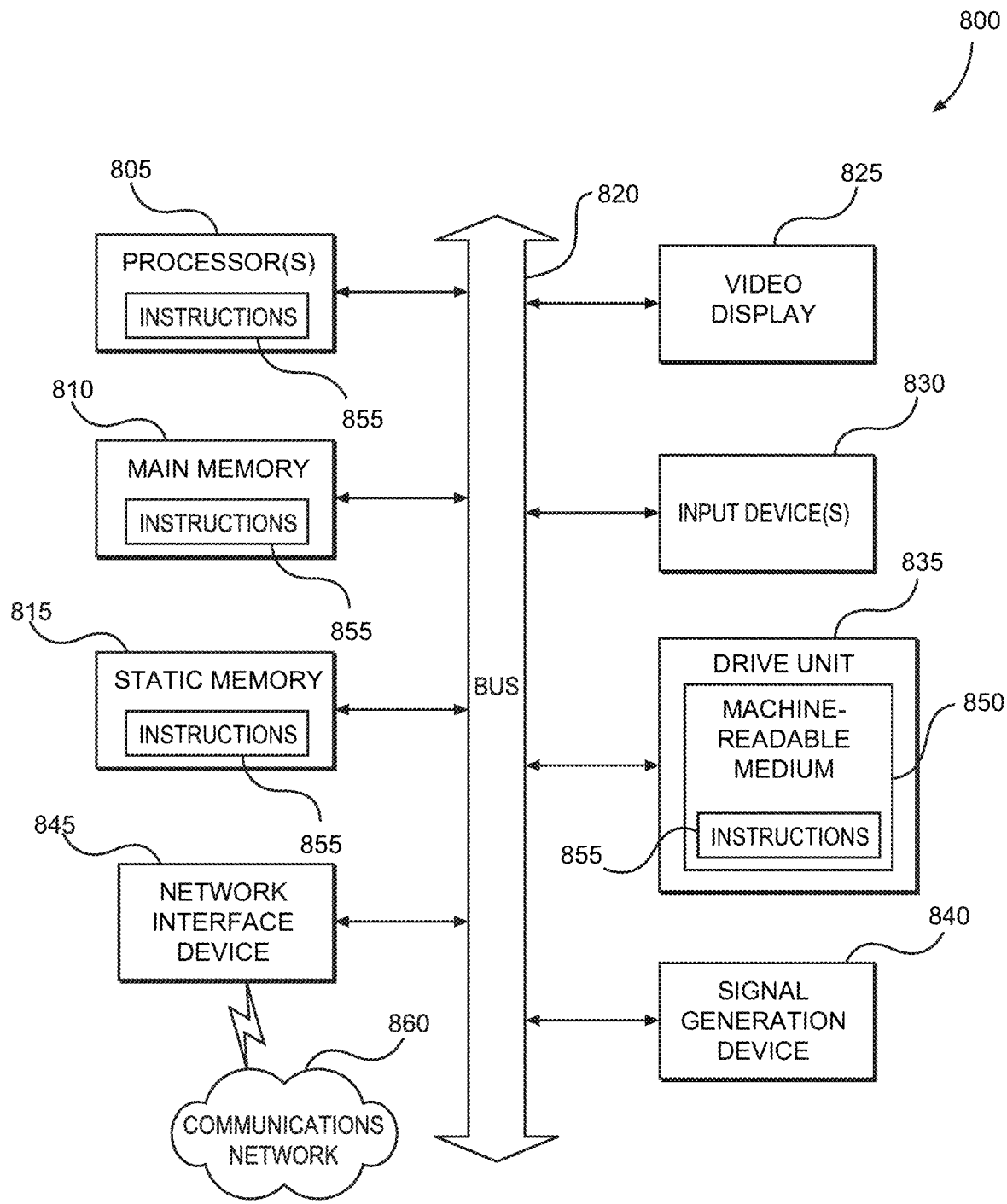
FIG. 8 is a diagrammatic representation of an example machine in the form of a computer system used for execution of systems and methods of the present technology, according to various embodiments.

In various embodiments the vacuum cooking food processing system 100 may further comprise a main operation panel 1, the main operation panel 1 being electronically connected to the vacuum cooking food processing system 100 for controlling vacuum cooking of the non-animal protein, High Moisture Extrusion (HME) food product, the main operation panel 1 comprising a computing system as described in more detail with regarding to FIG. 8. In some embodiments the present disclosure is directed to a system of one or more computers which can be configured to perform particular operations or actions by virtue of having software, firmware, hardware, or a combination thereof installed on the system that in operation causes or cause the system (e.g., the vacuum cooking food processing system 100) to perform actions and/or method steps as described herein.

In various embodiments the main operation panel 1 comprising a computing system as described in more detail with regarding to FIG. 8, includes at least one processor; and a memory storing processor-executable instructions, wherein the at least one processor is configured to implement the following operations upon executing the processor-executable instructions: automatically sensing pressure in the vacuum tumbler 29 using the vacuum sensor 16, the automatically sensing pressure including a base pressure. For example, using a pressure sensor (now shown) connected to the main operation panel 1 the base pressure may be determined to be ambient pressure. Furthermore, the operations may include automatically sensing temperature of the non-animal protein, High Moisture Extrusion (HME) food product in the vacuum tumbler 29 using the temperature sensor 12, the automatically sensing temperature including sensing a base temperature. For example, using the temperature sensor 12 connected to the main operation panel 1 the base temperature may be determined to be ambient temperature. Furthermore, the operations may include automatically and dynamically controlling, based on the base pressure and the base temperature, an adjusted pressure in the vacuum tumbler 29 using the vacuum valve 17 (e.g., pneumatic vacuum valve 17) and the steam injector 13 (e.g., a steam lance) thereby guiding a tenderness and a texture of the non-animal protein, High Moisture Extrusion (HME) food product; and automatically and dynamically controlling, based on the adjusted pressure in the vacuum tumbler, a water-based flavor solution in the vacuum tumbler 29 using the dosing steam nozzle 25 thereby adjusting a taste of the non-animal protein, High Moisture Extrusion (HME) food product.

In some embodiments of the present technology the automatically and dynamically controlling the water-based flavor solution in the vacuum tumbler 29 comprises increasing the water-based flavor solution in the vacuum tumbler 29 to increase a flavor of the non-animal protein, High Moisture Extrusion (HME) food product. For example, In some embodiments the automatically and dynamically controlling the water-based flavor solution in the vacuum tumbler 29 comprises increasing total water content in the vacuum tumbler 29 to decrease a flavor of the non-animal protein, High Moisture Extrusion (HME) food product. For example, the supply water 23 (e.g., hose nipple may be 0.5 inches in diameter), water ring pump 26, water ring pump inflow 27 (e.g., thread may be 0.5 inches in diameter), and water ring pump return 28 (e.g., thread may be ¾ inches) may be used for increasing total water content in the vacuum tumbler 29.

In some embodiments the automatically and dynamically controlling the adjusted pressure in the vacuum tumbler 29 comprises increasing the adjusted pressure in the vacuum tumbler 29 using the steam injector 13 (e.g., a steam lance) thereby decreasing absorption of the water-based flavor solution by the non-animal protein, High Moisture Extrusion (HME) food product in the vacuum tumbler 29 by preventing separating of the non-animal protein, High Moisture Extrusion (HME) food product into chunks during vacuum cooking thereby inhibiting absorption of the water-based flavor solution by the chunks of the non-animal protein, High Moisture Extrusion (HME) food product.

In various embodiments the increasing the adjusted pressure in the vacuum tumbler 29 using the steam injector 13 (e.g., a steam lance) comprises injecting steam into the non-animal protein, High Moisture Extrusion (HME) food product in the vacuum tumbler 29 increasing the adjusted pressure in the vacuum tumbler 29 compared with the base pressure (e.g., ambient pressure).

In some embodiments the steam injector 13 is a direct steam injector, the direct steam injector being a steam lance.

In various embodiments the injecting the steam into the non-animal protein, High Moisture Extrusion (HME) food product in the vacuum tumbler 29 comprises controlling a volume and a rate of the injecting steam, the volume and the rate of steam injection guiding the texture of the non-animal protein, High Moisture Extrusion (HME) food product. For example, the steam injector 13 (e.g., a steam lance) may be adjusted to control the volume and rate of steam injected into the vacuum tumbler 29.

In some embodiments the steam injector 13 is a steam infuser, the steam infuser simultaneously heating, mixing, and pumping the non-animal protein, High Moisture Extrusion (HME) food product using infused steam.

In various embodiments the automatically and dynamically controlling the adjusted pressure in the vacuum tumbler 29 comprises decreasing the adjusted pressure in the vacuum tumbler 29 compared with the base pressure using the vacuum valve 17 (e.g., a pneumatic vacuum valve) increasing absorption of the water-based flavor solution by the non-animal protein, High Moisture Extrusion (HME) food product in the vacuum tumbler 29 by separating the non-animal protein, High Moisture Extrusion (HME) food product into chunks during vacuum cooking causing absorption of the water-based flavor solution by the chunks of the non-animal protein, High Moisture Extrusion (HME) food product thereby guiding a tenderness and a texture of the non-animal protein, High Moisture Extrusion (HME) food product.

In some embodiments the decreasing the adjusted pressure in the vacuum tumbler 29 compared with the base pressure comprises releasing steam from the vacuum tumbler 29 using the vacuum valve 17 (e.g., a pneumatic vacuum valve) thereby decreasing the adjusted pressure in the vacuum tumbler 29.

In various embodiments the texture of the non-animal protein, High Moisture Extrusion (HME) food product is an animal-meat-like texture; and the tenderness of the non-animal protein, High Moisture Extrusion (HME) food product is an animal-meat-like tenderness.

In some embodiments the guiding the tenderness and the texture of the non-animal protein, High Moisture Extrusion (HME) food product comprises stabilizing the pressure in the vacuum tumbler 29 and the temperature of the non-animal protein, High Moisture Extrusion (HME) food product in the vacuum tumbler 29 using a pressure and temperature dynamic feedback loop. For example, real-time data may be sent to the main operating panel 1 using the sensors (e.g., the vacuum sensor 16, the temperature sensor 12) described herein for the pressure and temperature dynamic feedback loop.

In various embodiments the pressure and temperature dynamic feedback loop comprises: receiving a recipe pressure for a food product recipe; comparing the base pressure to the recipe pressure for the food product recipe; and the automatically and dynamically controlling the adjusted pressure in the vacuum tumbler 29 comprises matching the adjusted pressure in the vacuum tumbler 29 to the recipe pressure for the food product recipe. For example, a recipe for the non-animal protein, High Moisture Extrusion (HME) food product may be for chicken breast analog or beef burger analog that may require a specific pressure for a good quality food product with meat-like structure and taste. The pressure and temperature dynamic feedback loop of the present technology may be used for the specific pressure in the vacuum tumbler 29 for the good quality food product with meat-like structure and taste (e.g., chicken breast analog or beef burger analog).

In some embodiments the pressure and temperature dynamic feedback loop comprises: receiving a recipe temperature for a food product recipe; comparing the base temperature to the recipe temperature for the food product recipe; and the at least one processor is further configured to implement the operation of: automatically and dynamically controlling an adjusted temperature of the non-animal protein, High Moisture Extrusion (HME) food product in the vacuum tumbler 29, the automatically and dynamically controlling the adjusted temperature of the non-animal protein, High Moisture Extrusion (HME) food product in the vacuum tumbler 29 comprising matching the adjusted temperature in the vacuum tumbler 29 to the recipe temperature for the food product recipe. For example, a recipe for the non-animal protein, High Moisture Extrusion (HME) food product may be for chicken breast analog or beef burger analog that may require a specific temperature for a good quality food product with meat-like structure and taste. The pressure and temperature dynamic feedback loop of the present technology may be used for the specific temperature in the vacuum tumbler 29 for the good quality food product with meat-like structure and taste (e.g., chicken breast analog or beef burger analog).

In various embodiments the pressure and temperature dynamic feedback loop comprises: receiving a recipe pressure and a recipe temperature for a food product recipe; comparing the base pressure to the recipe pressure for the food product recipe and the base temperature to the recipe temperature for the food product recipe; wherein the automatically and dynamically controlling the adjusted pressure in the vacuum tumbler 29 comprises matching the adjusted pressure in the vacuum tumbler 29 to the recipe pressure for the food product recipe; and wherein the at least one processor is further configured to implement the operation of: automatically and dynamically controlling an adjusted temperature of the non-animal protein, High Moisture Extrusion (HME) food product in the vacuum tumbler 29, the automatically and dynamically controlling the adjusted temperature of the non-animal protein, High Moisture Extrusion (HME) food product in the vacuum tumbler 29 comprising matching the adjusted temperature in the vacuum tumbler 29 to the recipe temperature for the food product recipe. For example, a recipe for the non-animal protein, High Moisture Extrusion (HME) food product may be for chicken breast analog or beef burger analog that may require a specific pressure and a specific temperature for a good quality food product with meat-like structure and taste. The pressure and temperature dynamic feedback loop of the present technology may be used for the specific pressure and the specific temperature in the vacuum tumbler 29 for the good quality food product with meat-like structure and taste (e.g., chicken breast analog or beef burger analog).

In some embodiments the vacuum cooking food processing system 100 further comprises a scale to determine a weight of the vacuum tumbler 29 used for controlling a water content in the vacuum tumbler 29. For example, the scale may be used to determine an amount of water added to in the vacuum tumbler 29 during vacuum cooking.

Figure 2:
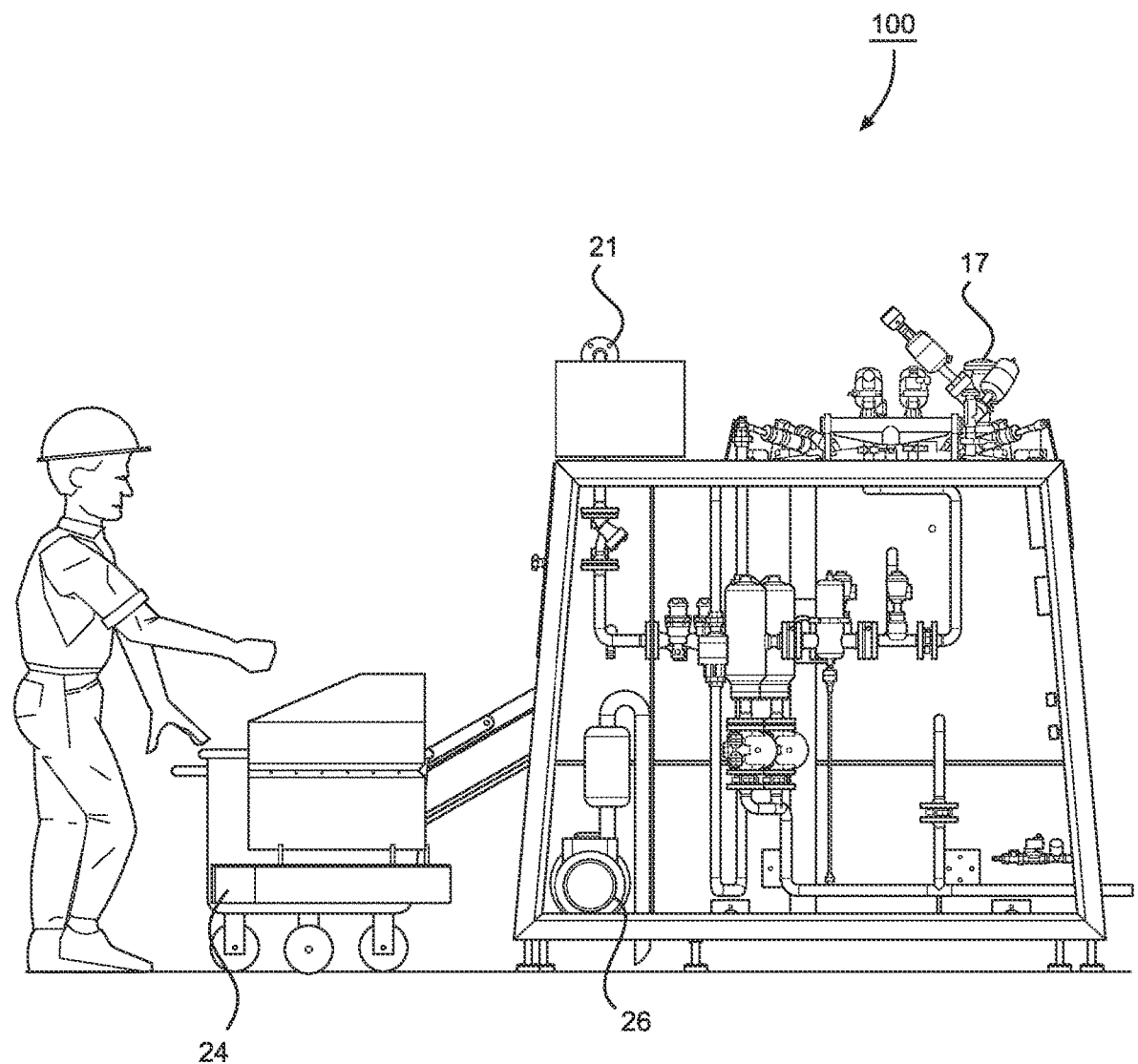
FIG. 2 illustrates a right-side view of the system for vacuum cooking a non-animal protein, High Moisture Extrusion (HME) food product using steam injection, according to various embodiments of the present technology.

FIG. 2 illustrates a right-side view of the system for vacuum cooking a non-animal protein, High Moisture Extrusion (HME) food product using steam injection, according to various embodiments of the present technology. FIG. 2 shows the following elements of the vacuum cooking food processing system 100: water ring pump 26, the vacuum valve 17 (e.g., a pneumatic vacuum valve), the steam double jacket 21, and the foldable lift 24.

Figure 3:
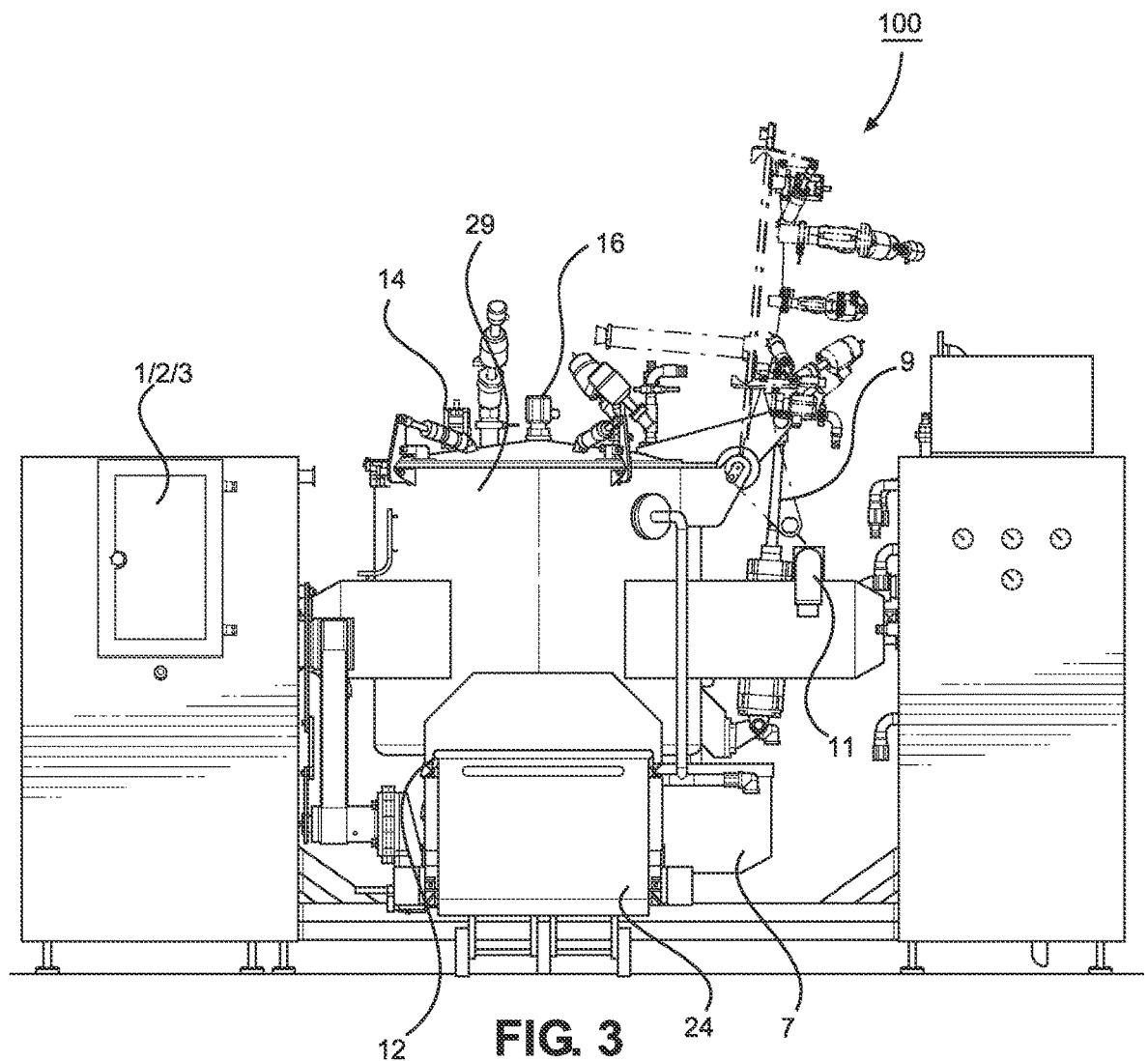
FIG. 3 is a front view of the system for vacuum cooking a non-animal protein, High Moisture Extrusion (HME) food product using steam injection, according to various embodiments of the present technology.

FIG. 3 is a front view of the system for vacuum cooking a non-animal protein, High Moisture Extrusion (HME) food product using steam injection, according to various embodiments of the present technology. FIG. 3 shows the vacuum cooking food processing system 100 including the main operation panel 1 (e.g., may include a touch screen user interface), including the main switch 2, and the emergency stop 3. FIGS. 3 further shows the following: the first safety valve 14, the vacuum tumbler 29, the vacuum sensor 16, a pneumatic cylinder 9, a pneumatic cable 11, the temperature sensor 12, the foldable lift 24, and a mixing motor 7.

Figure 4:
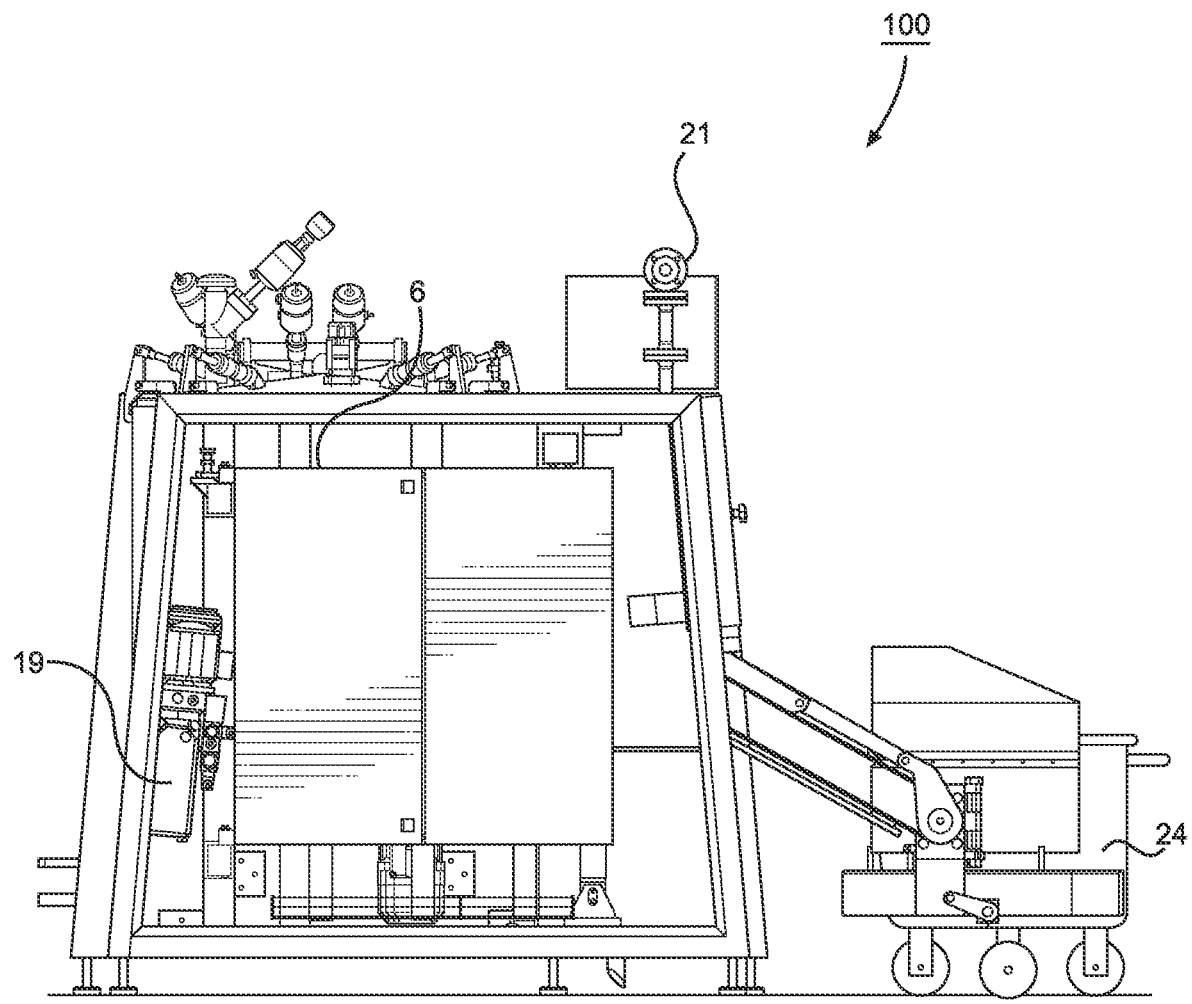
FIG. 4 is a left-side view of the system for vacuum cooking a non-animal protein, High Moisture Extrusion (HME) food product using steam injection, according to various embodiments of the present technology.

FIG. 4 is a left-side view of the system for vacuum cooking a non-animal protein, High Moisture Extrusion (HME) food product using steam injection, according to various embodiments of the present technology. FIG. 4 shows the following elements: a tilting motor 6 and a hydraulic aggregate 19, the steam double jacket 21, and the foldable lift 24.

Figure 5:
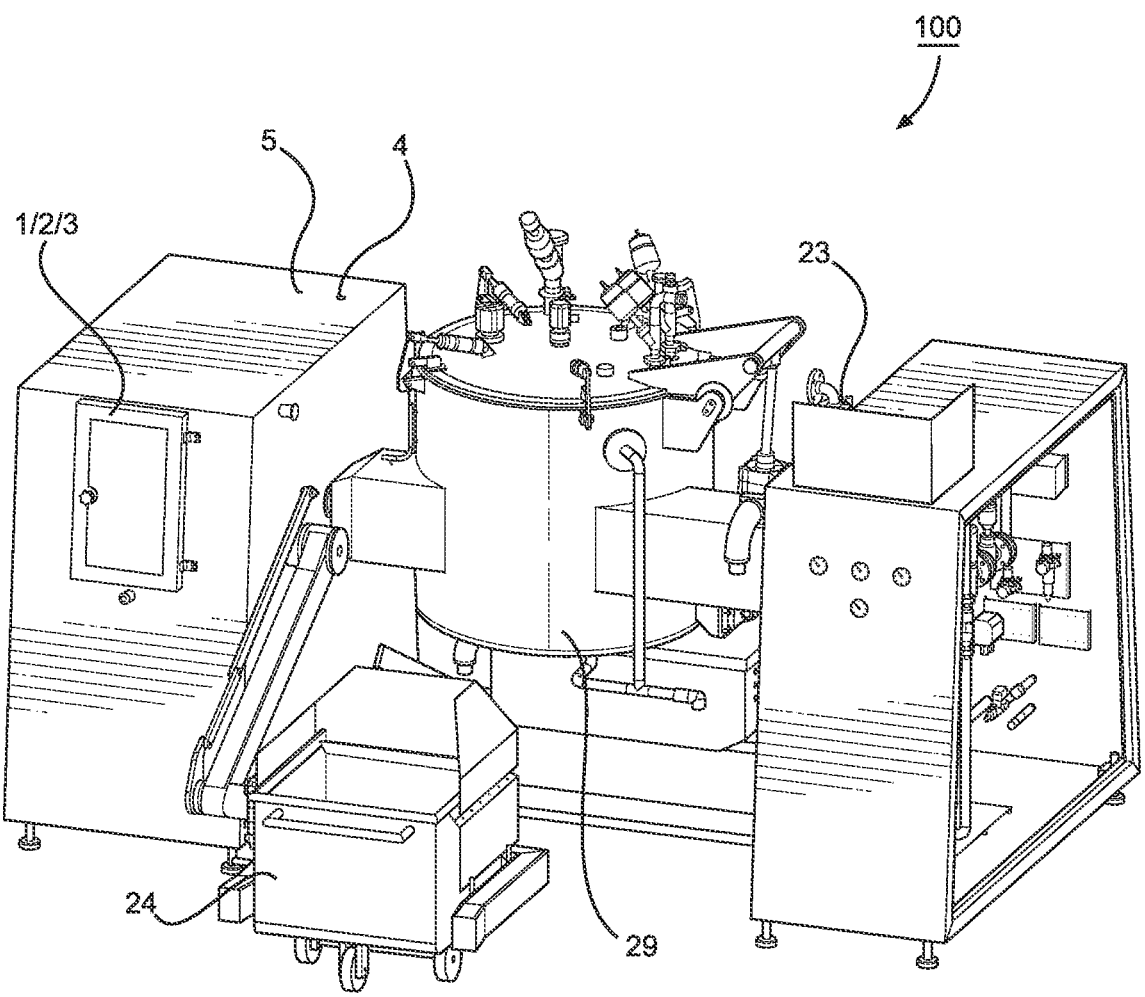
FIG. 5 illustrates a perspective front view of the system for vacuum cooking a non-animal protein, High Moisture Extrusion (HME) food product using steam injection, according to various embodiments of the present technology.

FIG. 5 illustrates a perspective front view of the system for vacuum cooking a non-animal protein, High Moisture Extrusion (HME) food product using steam injection, according to various embodiments of the present technology. the vacuum cooking food processing system 100 including the main operation panel 1 (e.g., may include a touch screen user interface), including the main switch 2, and the emergency stop 3. FIG. 5 further shows the power inlet 4 and the air inlet 5. FIG. 5 also shows the following elements: the supply water 23 (e.g., hose nipple may be 0.5 inches in diameter), the foldable lift 24, and the vacuum tumbler 29.

Figure 6:
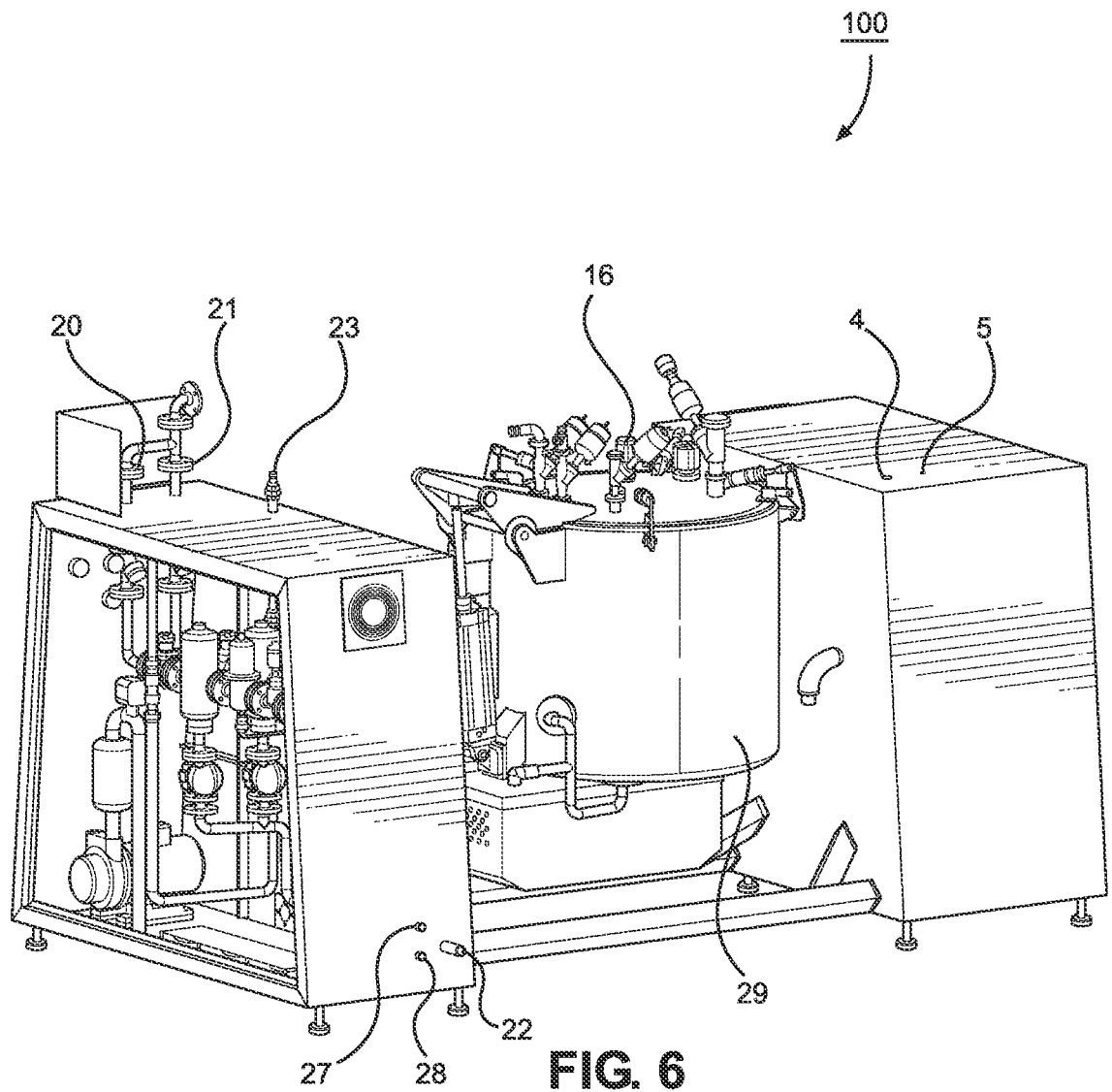
FIG. 6 illustrates a perspective back view of the system for vacuum cooking a non-animal protein, High Moisture Extrusion (HME) food product using steam injection, according to various embodiments of the present technology.

FIG. 6 illustrates a perspective back view of the system for vacuum cooking a non-animal protein, High Moisture Extrusion (HME) food product using steam injection, according to various embodiments of the present technology. FIG. 6 shows the following elements: the power inlet 4, the air inlet 5, direct steam 20 (e.g., flange), steam double jacket 21, condensate return 22 (e.g., thread may be 1 inch in diameter), supply water 23 (e.g., hose nipple may be 0.5 inches in diameter), vacuum sensor 16, water ring pump inflow 27 (e.g., thread may be 0.5 inches in diameter), water ring pump return 28 (e.g., thread may be ¾ inches), and vacuum tumbler 29.

Figure 7:
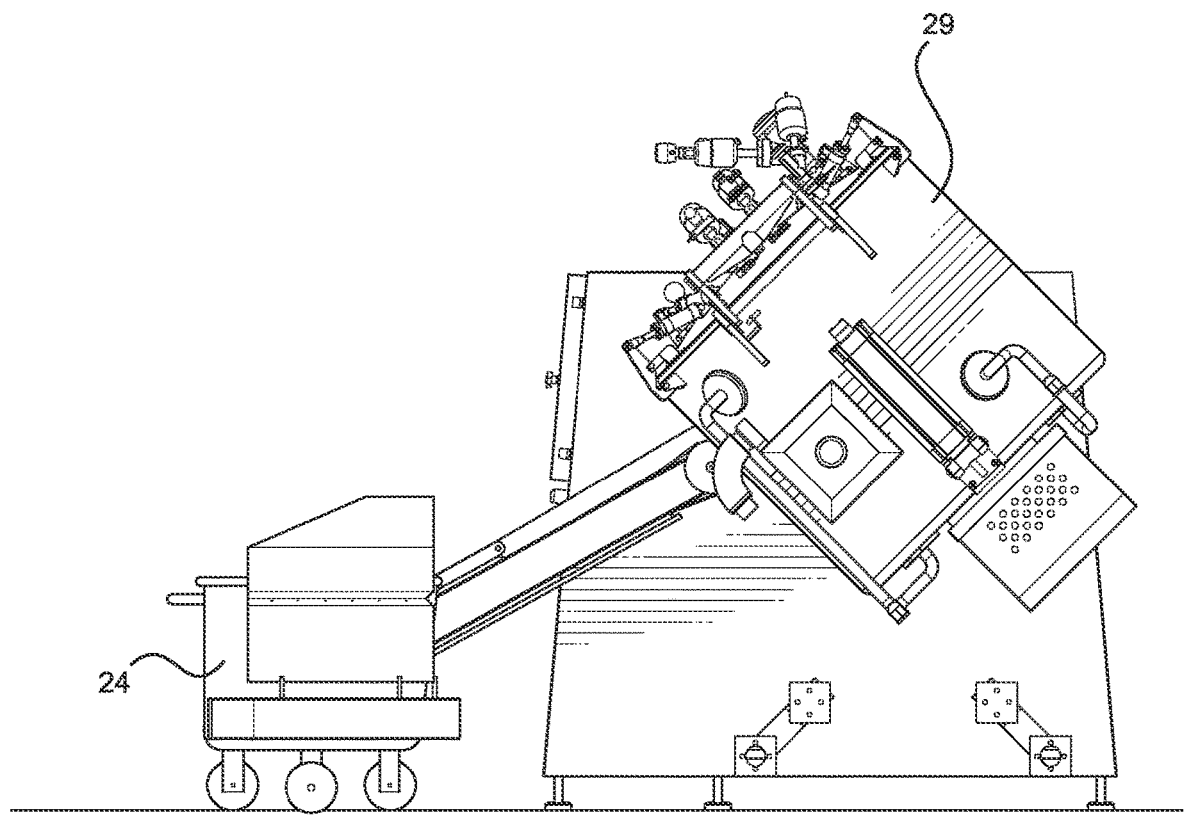
FIG. 7 a vacuum tumbler of the system for vacuum cooking a non-animal protein, High Moisture Extrusion (HME) food product using steam injection, according to various embodiments of the present technology.

FIG. 7 a vacuum tumbler of the system for vacuum cooking a non-animal protein, High Moisture Extrusion (HME) food product using steam injection, according to various embodiments of the present technology. FIG. 7 shows the foldable lift 24 and the vacuum tumbler 29 during vacuum cooking.

FIG. 8 is a diagrammatic representation of an example machine in the form of a computer system used for execution of systems and methods of the present technology, according to various embodiments. FIG. 8 shows a diagrammatic representation of a computing device for a machine in the example electronic form of a computer system 800, within which a set of instructions for causing the machine to perform any one or more of the methodologies discussed herein can be executed. In example embodiments, the machine operates as a standalone device, or can be connected (e.g., networked) to other machines. In a networked deployment, the machine can operate in the capacity of a server, a client machine in a server-client network environment, or as a peer machine in a peer-to-peer (or distributed) network environment. The machine can be a personal computer (PC), tablet PC, game console, set-top box (STB), personal digital assistant (PDA), television device, cellular telephone, portable music player (e.g., a portable hard drive audio device), web appliance, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein. Computer system 800 can be an instance of the main control operation 1 shown in FIG. 1.

The example computer system 800 includes a processor or multiple processors 805 (e.g., a central processing unit (CPU), a graphics processing unit (GPU), or both), and a main memory 810 and a static memory 815, which communicate with each other via a bus 820. The computer system 800 can further include a video display unit 825 (e.g., a liquid-crystal display (LCD), organic light emitting diode (OLED) display, or a cathode ray tube (CRT)). The computer system 800 also includes at least one input device 830, such as an alphanumeric input device (e.g., a keyboard), a cursor control device (e.g., a mouse), a microphone, a digital camera, a video camera, and so forth. The computer system 800 also includes a disk drive unit 835, a signal generation device 840 (e.g., a speaker), and a network interface device 845.

The drive unit 835 (also referred to as the disk drive unit 835) includes a machine-readable medium 850 (also referred to as a computer-readable medium 850), which stores one or more sets of instructions and data structures (e.g., instructions 855) embodying or utilized by any one or more of the methodologies or functions described herein. The instructions 855 can also reside, completely or at least partially, within the main memory 810, static memory 815 and/or within the processor(s) 805 during execution thereof by the computer system 800. The main memory 810, static memory 815, and the processor(s) 805 also constitute machine-readable media.

The instructions 855 can further be transmitted or received over a communications network 860 via the network interface device 845 utilizing any one of a number of well-known transfer protocols (e.g., Hyper Text Transfer Protocol (HTTP), CAN, Serial, and Modbus). The communications network 860 includes the Internet, local intranet, Personal Area Network (PAN), Local Area Network (LAN), Wide Area Network (WAN), Metropolitan Area Network (MAN), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, Digital Subscriber Line (DSL) connection, Ethernet connection, Integrated Services Digital Network (ISDN) line, cable modem, Asynchronous Transfer Mode (ATM) connection, or an Fiber Distributed Data Interface (FDDI) or Copper Distributed Data Interface (CDDI) connection. Furthermore, communications network 860 can also include links to any of a variety of wireless networks including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), cellular digital packet data (CDPD), Research in Motion, Limited (RIM) duplex paging network, Bluetooth radio, or an IEEE 802.11-based radio frequency network.

While the machine-readable medium 850 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, the technology for vacuum cooking a non-animal protein, High Moisture Extrusion (HME) food product using steam injection is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for vacuum cooking a non-animal protein, High Moisture Extrusion (HME) food product using steam injection, the system comprising:
    a vacuum cooking food processing system, the vacuum cooking food processing system comprising:
    a vacuum tumbler comprising:
    a vacuum sensor;
    a temperature sensor;
    a vacuum valve;
    a steam injector; and
    a dosing steam nozzle;
    a scale to determine a weight of the vacuum tumbler used for controlling a water content in the vacuum tumbler; and
    a main operation panel, the main operation panel being electronically connected to the vacuum cooking food processing system for controlling vacuum cooking of the non-animal protein, High Moisture Extrusion (HME) food product, the main operation panel comprising:
    at least one processor; and
    a memory storing processor-executable instructions, wherein the at least one processor is configured to implement the following operations upon executing the processor-executable instructions:
    automatically sensing pressure in the vacuum tumbler using the vacuum sensor, the automatically sensing pressure including sensing a base pressure;
    automatically sensing temperature of the non-animal protein, High Moisture Extrusion (HME) food product in the vacuum tumbler using the temperature sensor, the automatically sensing temperature including sensing a base temperature;
    automatically and dynamically controlling, based on the base pressure and the base temperature, an adjusted pressure in the vacuum tumbler using the vacuum valve and the steam injector thereby guiding a tenderness and a texture of the non-animal protein, High Moisture Extrusion (HME) food product; and
    automatically and dynamically controlling, based on the adjusted pressure in the vacuum tumbler, a water-based flavor solution in the vacuum tumbler using the dosing steam nozzle thereby adjusting a taste of the non-animal protein, High Moisture Extrusion (HME) food product.

2. The system of claim 1, wherein the automatically and dynamically controlling the water-based flavor solution in the vacuum tumbler comprises increasing the water-based flavor solution in the vacuum tumbler to increase a flavor of the non-animal protein, High Moisture Extrusion (HME) food product.

3. The system of claim 1, wherein the automatically and dynamically controlling the water-based flavor solution in the vacuum tumbler comprises increasing total water content in the vacuum tumbler to decrease a flavor of the non-animal protein, High Moisture Extrusion (HME) food product.

4. The system of claim 1, wherein the automatically and dynamically controlling the water-based flavor solution in the vacuum tumbler comprises increasing the adjusted pressure in the vacuum tumbler using the steam injector thereby decreasing absorption of the water-based flavor solution by the non-animal protein, High Moisture Extrusion (HME) food product in the vacuum tumbler by preventing separating of the non-animal protein, High Moisture Extrusion (HME) food product into chunks during the vacuum cooking thereby inhibiting absorption of the water-based flavor solution by the chunks of the non-animal protein, High Moisture Extrusion (HME) food product.

5. The system of claim 4, wherein the increasing the adjusted pressure in the vacuum tumbler using the steam injector comprises injecting steam into the non-animal protein, High Moisture Extrusion (HME) food product in the vacuum tumbler thereby increasing the adjusted pressure in the vacuum tumbler compared with the base pressure.

6. The system of claim 5, wherein the steam injector is a direct steam injector, the direct steam injector being a steam lance.

7. The system of claim 5, wherein the injecting the steam into the non-animal protein, High Moisture Extrusion (HME) food product in the vacuum tumbler comprises adjusting a volume and a rate of the injecting the steam, the volume and the rate of steam injection guiding the texture of the non-animal protein, High Moisture Extrusion (HME) food product.

8. The system of claim 5, wherein the steam injector is a steam infuser, the steam infuser simultaneously heating, mixing, and pumping the non-animal protein, High Moisture Extrusion (HME) food product using infused steam.

9. The system of claim 1, wherein the automatically and dynamically controlling the water-based flavor solution in the vacuum tumbler comprises decreasing the adjusted pressure in the vacuum tumbler compared with the base pressure using the vacuum valve increasing absorption of the water-based flavor solution by the non-animal protein, High Moisture Extrusion (HME) food product in the vacuum tumbler by separating the non-animal protein, High Moisture Extrusion (HME) food product into chunks during vacuum cooking causing absorption of the water-based flavor solution thereby guiding the tenderness and the texture of the non-animal protein, High Moisture Extrusion (HME) food product.

10. The system of claim 9, wherein the decreasing the adjusted pressure in the vacuum tumbler compared with the base pressure comprises releasing steam from the vacuum tumbler using the vacuum valve thereby decreasing the adjusted pressure in the vacuum tumbler.

11. The system of claim 9, wherein the texture of the non-animal protein, High Moisture Extrusion (HME) food product is an animal-meat-like texture; and wherein the tenderness of the non-animal protein, High Moisture Extrusion (HME) food product is an animal-meat-like tenderness.

12. The system of claim 1, wherein the guiding the tenderness and the texture of the non-animal protein, High Moisture Extrusion (HME) food product comprises stabilizing the pressure in the vacuum tumbler and the temperature of the non-animal protein, High Moisture Extrusion (HME) food product in the vacuum tumbler using a pressure and temperature dynamic feedback loop.

13. The system of claim 12, wherein the pressure and temperature dynamic feedback loop comprises:
receiving a recipe pressure for a food product recipe;
comparing the base pressure to the recipe pressure for the food product recipe; and
wherein the automatically and dynamically controlling the water-based flavor solution in the vacuum tumbler comprises matching the adjusted pressure in the vacuum tumbler to the recipe pressure for the food product recipe.

14. The system of claim 12, wherein the pressure and temperature dynamic feedback loop comprises:
receiving a recipe temperature for a food product recipe;
comparing the base temperature to the recipe temperature for the food product recipe; and
wherein the at least one processor is further configured to implement the operation of: automatically and dynamically controlling an adjusted temperature of the non-animal protein, High Moisture Extrusion (HME) food product in the vacuum tumbler, the automatically and dynamically controlling the adjusted temperature of the non-animal protein, High Moisture Extrusion (HME) food product in the vacuum tumbler comprising matching the adjusted temperature in the vacuum tumbler to the recipe temperature for the food product recipe.

15. The system of claim 12, wherein the pressure and temperature dynamic feedback loop comprises:
receiving a recipe pressure and a recipe temperature for a food product recipe;
comparing the base pressure to the recipe pressure for the food product recipe and the base temperature to the recipe temperature for the food product recipe;
wherein the automatically and dynamically controlling the water-based flavor solution in the vacuum tumbler comprises matching the adjusted pressure in the vacuum tumbler to the recipe pressure for the food product recipe; and
wherein the at least one processor is further configured to implement the operation of: automatically and dynamically controlling an adjusted temperature of the non-animal protein, High Moisture Extrusion (HME) food product in the vacuum tumbler, the automatically and dynamically controlling the adjusted temperature of the non-animal protein, High Moisture Extrusion (HME) food product in the vacuum tumbler comprising matching the adjusted temperature in the vacuum tumbler to the recipe temperature for the food product recipe.

16. A method for vacuum cooking a non-animal protein, High Moisture Extrusion (HME) food product using steam injection, the method comprising:
automatically sensing pressure in a vacuum tumbler using a vacuum sensor, the automatically sensing pressure including a base pressure;
automatically sensing temperature of the non-animal protein, High Moisture Extrusion (HME) food product in the vacuum tumbler using a temperature sensor, the automatically sensing temperature including sensing a base temperature;
automatically and dynamically controlling, based on the base pressure and the base temperature, an adjusted pressure in the vacuum tumbler using a vacuum valve and a steam injector thereby guiding a tenderness and a texture of the non-animal protein, High Moisture Extrusion (HME) food product; and
automatically and dynamically controlling, based on the adjusted pressure in the vacuum tumbler, a water-based flavor solution in the vacuum tumbler using a dosing steam nozzle thereby adjusting a taste of the non-animal protein, High Moisture Extrusion (HME) food product.

17. The method of claim 16, wherein the automatically and dynamically controlling the water-based flavor solution in the vacuum tumbler comprises increasing the adjusted pressure in the vacuum tumbler using the steam injector thereby decreasing absorption of the water-based flavor solution by the non-animal protein, High Moisture Extrusion (HME) food product in the vacuum tumbler by preventing separating of the non-animal protein, High Moisture Extrusion (HME) food product into chunks during vacuum cooking thereby inhibiting absorption of the water-based flavor solution by the chunks of the non-animal protein, High Moisture Extrusion (HME) food product.

* * * * *